No. 751,759. PATENTED FEB. 9, 1904.
R. H. SMITH.
COMBINED MOLDING PRESS, MOLD DRIER, AND VULCANIZER.
APPLICATION FILED SEPT. 15, 1903.
NO MODEL. 2 SHEETS—SHEET 1.

Witnesses: Inventor,
Richard Hale Smith,
by Wm. F. Bellows,
Attorney.

No. 751,759. PATENTED FEB. 9, 1904.
R. H. SMITH.
COMBINED MOLDING PRESS, MOLD DRIER, AND VULCANIZER.
APPLICATION FILED SEPT. 15, 1903.
NO MODEL. 2 SHEETS—SHEET 2.
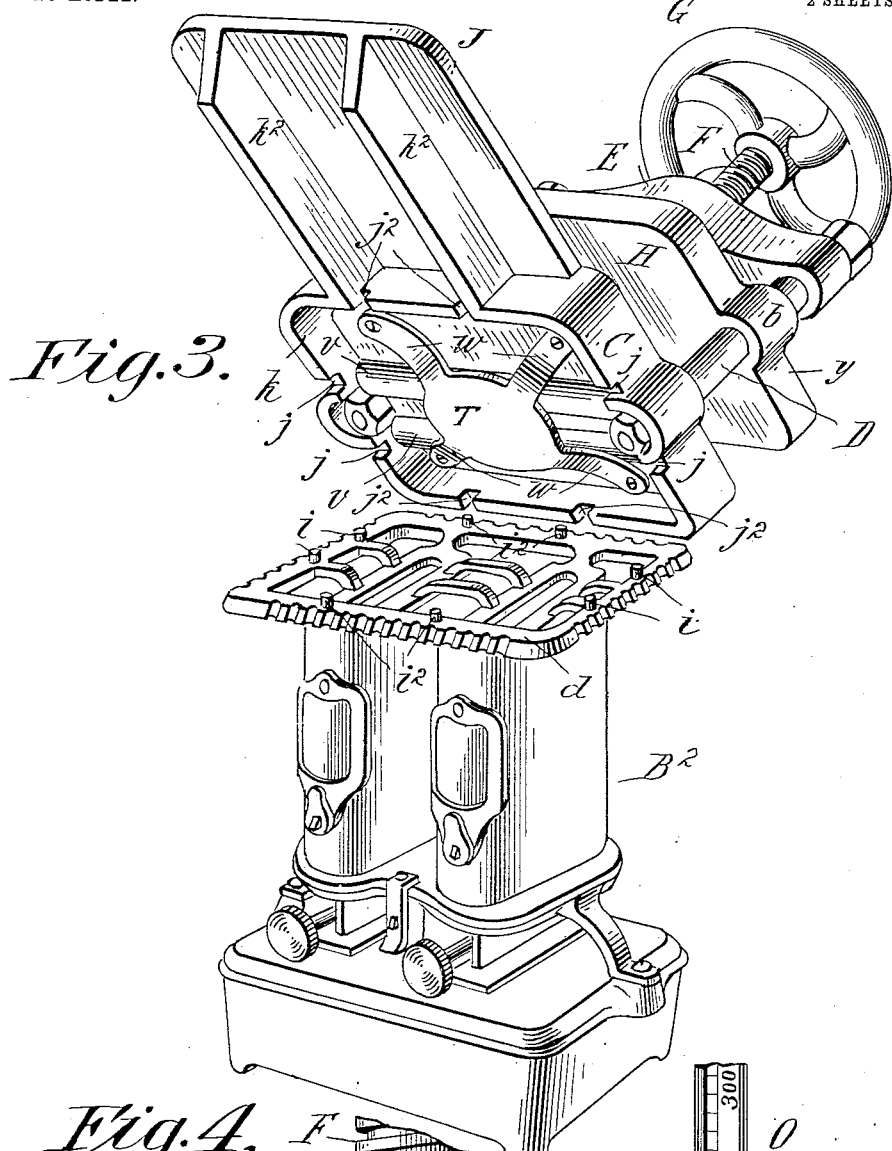
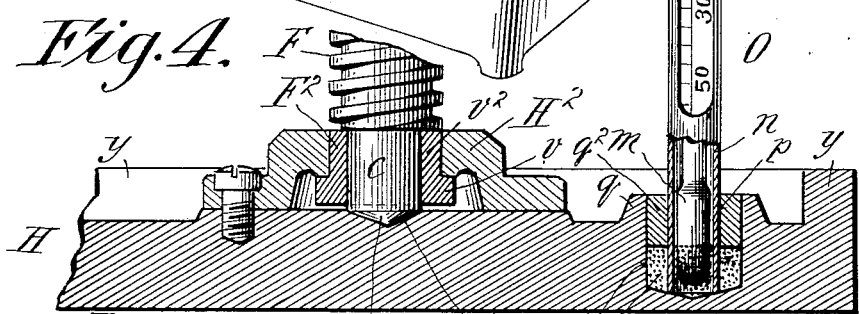

No. 751,759.

Patented February 9, 1904.

UNITED STATES PATENT OFFICE.

RICHARD HALE SMITH, OF SPRINGFIELD, MASSACHUSETTS.

COMBINED MOLDING-PRESS, MOLD-DRIER, AND VULCANIZER.

SPECIFICATION forming part of Letters Patent No. 751,759, dated February 9, 1904.

Application filed September 15, 1903. Serial No. 173,334. (No model.)

*To all whom it may concern:*

Be it known that I, RICHARD HALE SMITH, a citizen of the United States of America, and a resident of Springfield, in the county of Hampden and State of Massachusetts, have invented certain new and useful Improvements in a Combined Molding-Press, Mold-Drier, and Vulcanizer, of which the following is a full, clear, and exact description.

The object of this invention is to produce an apparatus which is especially well adapted for the making of rubber stereotype and other molded and vulcanized articles and whereby with the provision of simplified and improved appliances the manufacturer may make the mold by the employment, in a mold-press, of the chase of type in conjunction with a flask containing a compound of china-clay or other plastic mold material or composition, whereby he may readily dry the mold, employing a suitable heater, and whereby he may readily utilize both the molding-press and the heater for molding and vulcanizing rubber type cast in the mold made as aforesaid.

The invention consists in generally improved and simplified constructions, arrangements, and combinations of parts, substantially as hereinafter described in conjunction with the accompanying drawings, in which—

Figure 1:
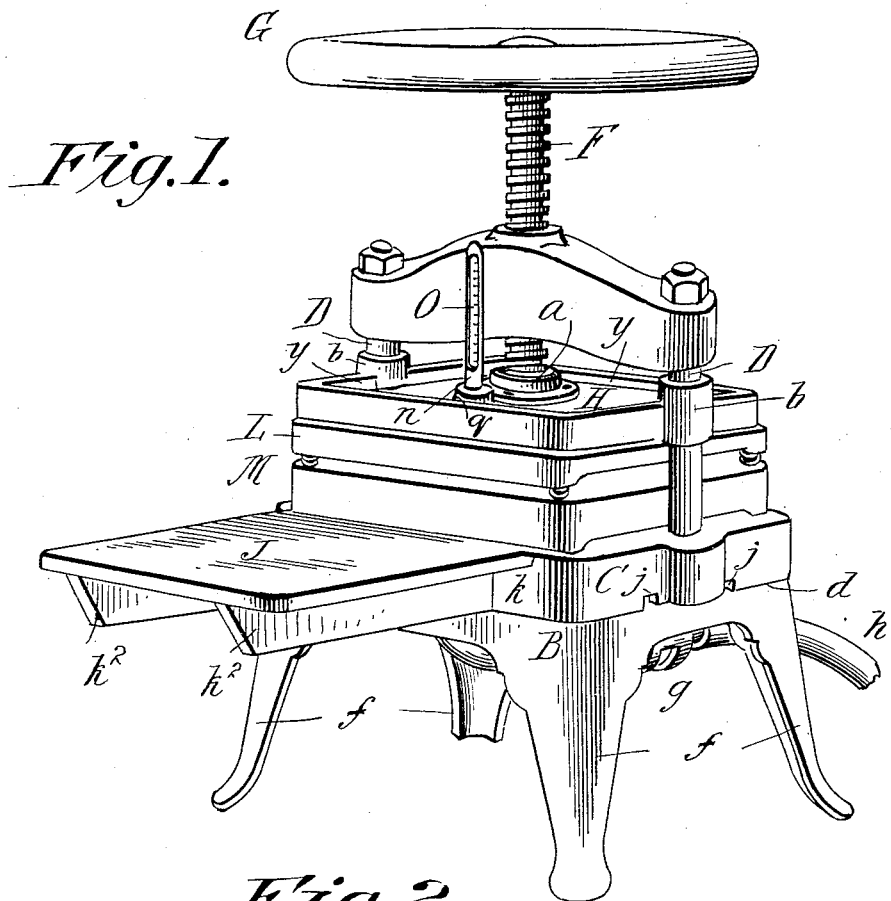
Figure 2:
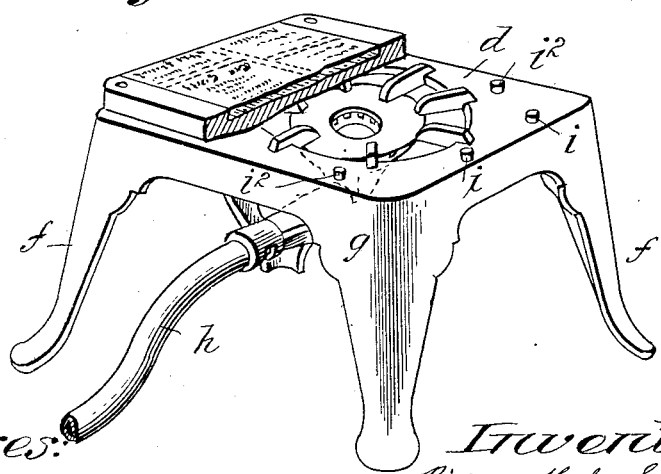

Figure 1 is a perspective view of a complete apparatus with the parts thereof assembled as in use for the production of a mold for manufacturing rubber type. Fig. 2 is a perspective view showing the lower portion of the apparatus serving as a drier for the plastic type-mold. Fig. 3 is a perspective view of the press and a heater of a different form from that shown in the preceding figures, both forms of heaters having, however, characteristics in common, as hereinafter pointed out. Fig. 4 is a partial sectional view vertically through the platen, showing a construction thereof pertaining to the thermometer-support and also the construction of the improved means which constitutes the swivel connection between the platen and its screw.

In the drawings, A represents the press used both for molding and for vulcanizing, and B represents the heater, which is available separately from the press for drying the plastic mold produced in the press and also in combination with the press for molding and vulcanizing the rubber type-sheet. The press comprises a base C, having at opposite sides the vertical posts D D, supporting at their upper portions the arched cross-head E, through which centrally and vertically engages the screw-shaft F, having at its top the hand-wheel G and having at its bottom an engagement with the upstanding circularly-socketed hub $a$ of the platen H, which has at its ends the vertically-apertured hubs $b$, affording guiding-bearings for the vertical movements of the platen relatively to the posts D D. The lower end extremity $c$ of the screw-shaft F is necked down and made of smaller diameter than the threaded portion of the shaft and is formed with the step end $c^2$ for bearing in the comparatively shallow conical socket $c^3$ in the central upper portion of the platen. An annular metallic bushing $F^2$ is permanently secured on the reduced cylindrical lower extremity of the screw, preferably by being heated and permitted to shrink fast thereon in cooling. This bushing $F^2$ has the outwardly-extending lower end flange $v$, while its upper portion $v^2$, which is exteriorly cylindrical, is made of the same diameter as the periphery of the threaded portion of the shaft F. The part $H^2$, which constitutes the engagement member between the screw and platen, is of substantially the usual form, comprising a base member screwed to the platen and an annular concentrically-located and somewhat elevated internal flanged portion, within the circular central hole through which the portion $v^2$ of the bushing is fitted, the external flange of the bushing engaging under the inner margin of the elevated internal flange of the connection piece or cap for the platen. With the annular and flanged part united on the lower end of the screw the assemblage of the parts may be performed by slipping the apertured connection piece or cap $H^2$ down over the screw from the upper end and securing it to the platen before the hand-wheel is connected, and a more substantial and efficient platen and screw-swivel connection is insured by the parts formed and combined as described, for the portion $v^2$, being approximately diametrically the same as the periphery of the threads of the screw and having also considerable depth of bearing, insures a good bearing for side thrust relatively between the platen and screw and the flange $v$ imparts a maximum area of supporting-bearing for the suspended platen, most satisfactorily balancing the same.

The base C of the press has the shelf-like front extension J on which to support the flask L and the chase M preparatory to the taking of each impression in the operation of making the mold, these parts in superimposed relations being slid onto the base proper and under the platen to be subjected to the pressure in the press for the mold-making result, and these parts may thereafter be withdrawn forwardly again onto the shelf extension to enable the operator to remove the mold to be dried. The shelf is also again utilized to hold the hot mold while the sheet of rubber is being applied preparatory to vulcanizing and again to draw out the hot work thereupon after vulcanizing.

The heater B (represented in Figs. 1 and 2) is shown as a gas-heater, the same comprising a rectangular centrally and circularly apertured top $d$, supported by the legs $f$ $f$ and having within and below the central aperture the annular gas-burner $g$, for which $h$ indicates the gas-supply pipe. The top of the heater has opposite end pairs $i$ $i$ of circular upstanding integrally-cast lugs or bosses and also front and rear pairs $i^2$ $i^2$ of similar upstanding lugs or bosses, and this arrangement of these lugs or bosses (partially indicated in Fig. 2) is carried out in precisely the same manner on the top of the heater $B^2$ of the form shown in Fig. 3, wherein the heater is one in which oil fuel is used in lieu of gas. The bosses $i$ $i$ are arranged in parallel lines longitudinally, and the bosses $i^2$ $i^2$ are arranged in parallel lines transversely of the top of the heater, and the arrangement of these lugs is such that they correspond to and match with the recesses $j$ $j$ and $j^2$ $j^2$, which are formed within the lower edges of the depending flange or rib $k$, comprised in the outer boundary of the base C of the press. These downwardly-opening recesses $j$ and $j^2$ extend from the inner to the outer faces of the depending base-flange $k$ and have their opposite walls, which are at right angles to the inner and outer faces of the base-flange, parallel with each other and separated by a distance to permit the recessed press-base to be readily brought into engagements with the correspondingly-arranged upstanding bosses of the heater-top, and the press may be placed with its shelf front either extending to the front or rear of the heater, as may be considered most convenient in use, the matching of the recessed base with the boss-provided heater-top being as easily accomplished in the one case as in the other, it being apparent that the parts when assembled become so interlocked as to prevent any liability of the press to shift or be displaced in any direction from the heater on which it is supported.

The provision of the downwardly-opening recesses $j$ and $j^2$ of the form and arrangement shown and mentioned is a most simple and easy expedient for acquiring the interengaging of the press with the heater, having the same efficiency as if the bosses of the heater engaged and nicely matched and fitted into circular sockets in the base, and yet requiring nowhere near the nicety and precision in manufacture as would be the case if the engagements were to be of the character of dowel-and-socket engagements, it being apparent that the said recesses in the base-flange may be readily cast, and if they are not found sufficiently free to permit the matching together of the press-base and heater-top they may be quickly and readily freed out with a coarse file.

The base C, its shelf, the depending base-flange $k$, and the shelf-strengthening depending ribs $k^2$ may be all integrally made of cast-iron, as represented in Fig. 3.

The plastic mold having been made in the press, which for convenience may be supported on the heater or otherwise supported, the mold is dried on the heater, the press at such time being remote therefrom, and on utilizing the mold for the making of a rubber type-sheet the mold and layer of rubber or other appropriate material are placed in superimposed relations in the press, which is supported on and heated by the heater, the platen of the press being understood as being sufficiently hot for the accomplishment of the molding and vulcanization of the rubber. In order to determine the heat of the platen, which must be sufficiently high, and yet not excessive, for the proper vulcanization, the platen is equipped with a thermometer O, the glass tube or bulb $m$ of which for containing the mercury or its equivalent being inclosed in a metallic sheath $n$, which is downwardly open, as indicated in Fig. 4, and this so-protected thermometer is fitted in and through a circular socket $p$ in an upstanding hub $q$ of the platen, there being at the base of the opening $p$ a cavity $t$, in which is a quantity of mercury $u$ sufficient to submerge the lower end of the thermometer, whereby the heat conductivity as between the metal of the platen and the metallic sheath of the thermometer is improved and rendered more direct, inuring to increased reliability of the heat indication by the thermometer. The lower portion of the cavity being, as shown, diametrically larger than the socket thereabove through which the sheathed thermometer fits, such formation is produced by making within the integral upstanding hub of the platen a vertical upwardly-opening circular chamber, in the upper portion of which is provided with a driving fit a metallic ring $q^2$, the central hole through which receives closely therethrough the thermometer-sheath.

In order that the flame of the heater will impart to the vulcanizing-press thereover a heat which will be distributed quite generally and comparatively uniformly throughout the entire area of the base and platen of the press, the base, which, as shown, is provided with intermediate depending ribs $v$ $v$ within its depending marginal flange $k$, has applied therein a metallic plate T, having arms $w$ radiating toward and inclined to contact against under portions of the base near the margins thereof, said arms being confined in any suitable manner, as by the employment of screws, as indicated, and such centrally-located plate, while measurably decreasing the degree to which the central portion of the press will be heated, through its outwardly-extending arms $w$ conducts a good proportion of the heat to the outer portions of the press and conduces to an equable heating of the latter, which is desirable in order to insure an equality in the vulcanization throughout the entire piece or sheet treated in the press. The heat transmitted to the platen through the base of the press is rendered as efficient on the marginal portions of the rubber sheet being vulcanized as throughout its middle portion because of the provision to the platen of the marginal rib $y$, which enables an increased volume of heat to be absorbed at the margins of the platen proportionate to the decreased heating, which otherwise would naturally be imparted to such marginal portion because of its remoteness from the centrally-located source of heat and from radiation.

While the press is shown as adapted to have supporting engagement in like manner with the stud-provided top of both a gas-heater and an oil-heater, either form of heater may be supplied to the rubber-type maker, or two heaters of similar or dissimilar kind may be supplied to the type-maker, so that he may utilize one as a mold-drier at the time when he is using the other in combination with the press for vulcanizing.

Having thus described my invention, what I claim, and desire to secure by Letters Patent, is—

1. In an apparatus of the character described, the combination with the heater having at its top a plurality of upstanding lugs, of the press having at the lower portion of its base a plurality of recesses, of approximately the width of said lugs, which extend inwardly from the outer faces of the base, for the purpose set forth.

2. In an apparatus of the character described, the combination with a heater having a flat top provided with upstanding lugs $i$ $i$ and $i^2$ $i^2$, opposite end and side pairs thereof being arranged in respectively parallel longitudinal and transverse lines, and the press having at the lower portion of its base the depending flange constructed with downwardly-opening end and side pairs of recesses $j$ $j$ and $j^2$ $j^2$ in arrangement corresponding to the lugs on the heater, and extending from the outer to the inner surfaces of said depending base-flange, as shown and for the purpose explained.

3. In an apparatus of the character described, the vulcanizing-press having, under and separated from, the intermediate portion of its base, a plate provided with members extending toward the margins of, and to contact against, the base, and means for retaining said appliance in its place beneath the base.

4. In a press for the purpose set forth, the platen provided with a mercury-containing cavity, and having an upwardly-extending contracted opening or thermometer-socket, of a metal-sheathed thermometer fitted through said opening and having its lower end submerged in the mercury in said cavity for the purpose explained.

5. In a press for the purpose set forth, the platen having an upwardly-opening circular chamber therein, provided in an upper portion thereof, with a metallic closely-fitted ring whereby is produced the socket $p$ which is diametrically smaller than the mercury-cavity constituted by the lower portion of said chamber, combined with the metal-sheathed thermometer, the lower portion of which fits down through said socket and protrudes into the mercury-cavity.

6. In an apparatus of the type set forth, a vulcanizing-press, a plate arranged beneath the base of the press, members formed thereon extending outwardly and engaging the outer edges of the base, means for retaining the plate in position, a platen arranged for movement to and from the press, and an upwardly-extended rib formed integral with the edges of the platen, providing means for the conserving of heat near the margin of the platen by the increase of the bulk of metal at the edges of the platen, substantially as described.

7. In a press for the purpose set forth, the combination with a platen and the screw-shaft provided at its lower extremity with the diametrically contracted portion and having united thereon the metallic bushing provided with the outwardly-extending flange at its lower portion, of the connection member $H^2$ comprising a base portion screwed to the platen, and the elevated internal flange, through the opening in which the body of said bushing rotatably fits, and beneath the inner marginal portion of the flange of which, said bushing-flange engages.

8. In a press for the purpose set forth, the combination with a platen having the centrally-located step-socket $c^3$, and the screw-shaft provided at its lower extremity with the diametrically contracted portion $c$ having the step end $c^2$, and having shrunk thereon the metallic bushing, the body of which is of a size corresponding to the periphery of the screw, and which is provided with the outwardly-extending flange $v$ at its lower portion, of the connection member $H^2$ comprising a base portion screwed to the platen, and the elevated internal flange, through the opening in which the body of said bushing rotatably fits, and beneath the inner marginal portion of the flange of which, said bushing-flange engages.

Signed by me at Springfield, Massachusetts, in presence of two subscribing witnesses.

RICHARD HALE SMITH.

Witnesses:
M. A. BERRY,
B. V. CRAFTS.